United States Patent
Bakir

(10) Patent No.: US 9,361,445 B2
(45) Date of Patent: Jun. 7, 2016

(54) MULTILINE ONE TIME PASSWORD

(71) Applicant: Google Inc., Mountain View, CA (US)

(72) Inventor: Gökhan Hasan Bakir, Zurich (CH)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 14/169,382

(22) Filed: Jan. 31, 2014

(65) Prior Publication Data
US 2015/0220728 A1   Aug. 6, 2015

(51) Int. Cl.
*G06F 17/16*   (2006.01)
*G06F 21/36*   (2013.01)

(52) U.S. Cl.
CPC ..................................... *G06F 21/36* (2013.01)

(58) Field of Classification Search
CPC .............. G06F 17/16; G06F 2212/454; H04L 25/0242
See application file for complete search history.

(56) References Cited

U.S. PATENT DOCUMENTS

2014/0279727 A1*   9/2014   Baraniuk ............. G06N 99/005
706/11

* cited by examiner

*Primary Examiner* — Josnel Jeudy
(74) *Attorney, Agent, or Firm* — Morris & Kamlay LLP

(57) ABSTRACT

A credential such as a One Time Password (OTP) can be proffered as a matrix of characters provided by a user. The verifier can accept that credential if it determines that the matrix is rank one. If it determines the matrix is not rank one, it can reject it or treat it as possibly corrupt due to one or more erroneous or missing entries. The verifier can factor the received matrix into two vectors and create a rank one projected matrix that is the product of the two vectors. The verifier can measure the distance between the received and projected matrices and accept the credential if the distance is within a distance threshold.

17 Claims, 2 Drawing Sheets

MULTILINE ONE TIME PASSWORD

BACKGROUND

A credential such as a One Time Password can be generated by a user, received by an intermediary and then forwarded to a verification server to be authenticated. An example of such a credential is a graphical indicium such as a QR code or the like. In developing economies, a user may not have access to a device with the sophistication to generate a OTP. Likewise, the user may not have access to a network over which to transmit the credential to an intermediary such as a service provider. While a service provider may have access to a network to transmit the credential to a verification server and receive a result, such transmission may be expensive and slow.

BRIEF SUMMARY

According to implementations of the disclosed subject matter, a message can be received that includes characters that can be arranged in a matrix. At least some of the characters can correspond to integers. An implementation can determine the rank of the received matrix. If the rank of the received matrix is equal to one the verification can be successful. If the rank of the received matrix is not equal to one, the received matrix may be invalid or contain entries that are erroneous or missing. Missing entries can be replaced with a zero or other numbers. An implementation can factor the received matrix to obtain two vectors and determine a projected matrix of rank one based on the product of the two vectors. The factoring can find the two vectors that minimize the distance between the received and the projected matrices, based on linear programming. The projected matrix can have one or more entries that are not integers, but which can be rounded to the nearest integer.

A distance can be determined between the received matrix and the projected matrix. In an implementation, the distance can be the number of changed entries from the received matrix to the projected matrix. If the distance is not within a distance threshold, then the received matrix can be rejected. Otherwise, it can be accepted as successfully verified. An example of distance threshold for a matrix with M rows and N columns is whether the number of changed entries is greater than the lesser of M and N (not within the distance threshold) or less than or equal to the lesser of M and N (within the distance threshold.)

An action can be taken based on the rejection or successful verification of the received matrix.

Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
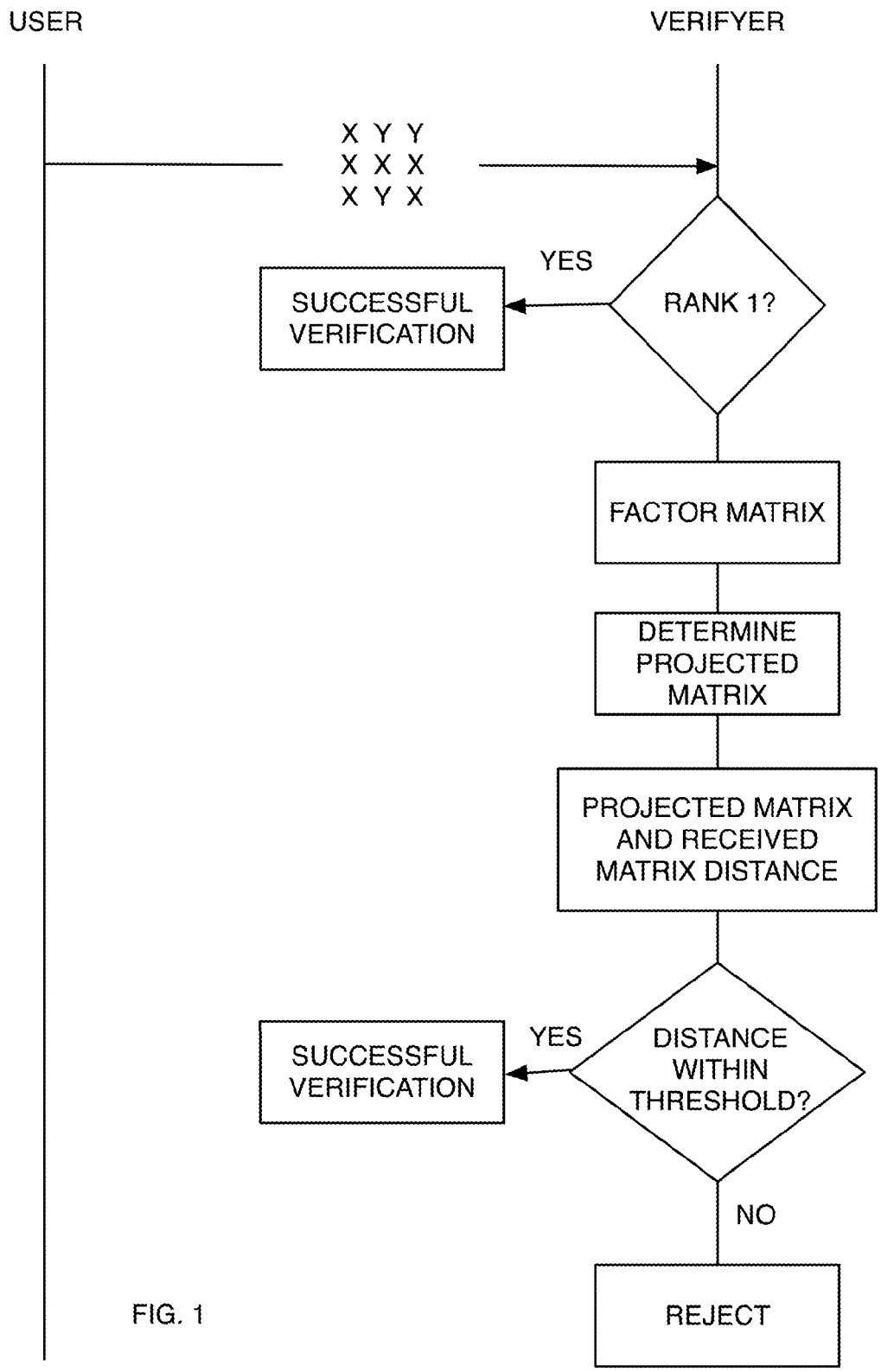
FIG. 1 shows a system according to an implementation of the disclosed subject matter.

An implementation in accordance with the disclosed subject matter can provide a way for a user with a basic mobile device with a limited display the ability to present a credential such as a OTP to a verifying authority. The verifying authority can verify the presented credential locally without having to send it over a network to a remote verification server. The verifying authority thus does not require a network connection to verify the credential and can do so without the delay and expense of accessing a remote server. Implementations can be useful in developing economies, where users may have access to basic cell phones and where network connections can be expensive and slow.

The credential can be based on a message containing characters arranged in a matrix. The use of a matrix can allow for a greater number of characters to be presented as the credential using a limited (e.g., text-only) display on a basic cell phone or other mobile device. The matrix can be imaged and analyzed using machine vision. The character set from which message is composed can be a limited character set such as ASCII, UTF-8 and the like. The limited character set can improve the accuracy and reliability of the machine vision analysis of the matrix because using fewer different characters can simplify the machine vision problem and can thereby reduce errors.

Characters of the matrix can be entered manually by a user. In an implementation, the user can obtain a string of characters that can be entered using a cell phone keypad. The mobile device can include a text wrap feature that automatically formats the string as a matrix. In another implementation, the characters may be presented to the user in a matrix (e.g., as a set of lines of characters) and the user can manually enter a "return" character at the end of each line to form the matrix on the mobile device. In another implementation, the characters can be delivered to the user device via SMS or other messaging service.

A matrix in accordance with an implementation can be of the form:

$$\begin{matrix} a_{11} & \cdots & a_{1M} \\ \vdots & & \vdots \\ a_{N1} & \cdots & a_{NM} \end{matrix}$$

An example of such a matrix can be:

$$\begin{matrix} X & Y & X \\ Y & X & Y \end{matrix}$$

A matrix can be written in the following singular vector decomposition factorization:

$$S = \sum_{i}^{r} \rho_i u_i v_i^T \quad \text{Equation (1)}$$

with $u_i \in \mathbb{R}^N$ and $v_i \in \mathbb{R}^M$. The parameter r is called the rank. Matrices with a specific rank may be generated from $u_i$, $v_i$. The rank parameter can relate to a degree of coupling between entries. For example, a rank one matrix can be generating from the pair (u, v), where every entry of the generated matrix has depends on at least one element from each of the vectors. For example, $$\begin{pmatrix} u_1 \\ u_2 \end{pmatrix} \cdot \begin{pmatrix} v_1 \\ v_2 \\ v_3 \end{pmatrix}^T = \begin{pmatrix} u_1 v_1 & u_1 v_2 & u_1 v_3 \\ u_2 v_1 & u_2 v_2 & u_2 v_3 \\ u_3 v_1 & u_3 v_2 & u_3 v_3 \end{pmatrix} =: S$$

For matrices $S \in \mathbb{Z}_+^{N \times M}$, factorization is not unique for the integer case, in contrast to the singular value decomposition. For example, for the scalar case $z = u \cdot v$, there may be many factorizations of the scalar z.

For rank one matrices with $u, v \in \mathbb{Z}_+$, all of the entries of matrix S will also be in $\mathbb{Z}_+$. However, an arbitrary matrix in $\mathbb{Z}_+$ may not have a factorization according to Equation (1) with u,v restricted to be integer. However, if S is a rank one matric and S+E is a rank one matrix with factorization in $\mathbb{Z}_+$, then the number of change entries $\|E\|_0$ is more than the number of rows or columns of the message, i.e., $$\|E\|_0 \geq \min(N, M)$$

In other words, rank one matrices in $\mathbb{Z}_+$ are far from one another. This insight can provide a basis for a valuable test of a matrix that is not rank one to help determine if it is based on a valid matrix, but has errors or omissions, or if it should be properly rejected as being invalid.

For example, a typographical or other error can alter an independent position in S. An error can be expressed as:

$$E = \sum_{(i,j) \in \varepsilon} e_i e_j^T \quad \text{Equation (2)}$$

An implementation can generate a rank one matrix, S, for a user to present as a credential. A verifying authority can receive a matrix to be tested, S', which can be imaged using, for example, a smartphone camera associated with the verifying authority. The smartphone camera can take a picture of a user device display showing the matrix S' and determine its rank. If the rank is determined to be equal to one, then the credential can be successfully verified and accepted. If the rank is greater than one, then the matrix S' can be rejected as being erroneous. An implementation can test a matrix whose rank is greater than one to determine if it is based on a valid matrix but has one or more incorrect entries or is missing entries. This can be done by computing a nearby rank one matrix and gauging its similarity to the matrix that was received.

For example, the following are rank one matrices S' that may be sent in OTP messages:

$$\begin{pmatrix} X & Y & Y \\ X & X & X \end{pmatrix}$$

$$\begin{pmatrix} Y & X & Y \\ Y & X & Y \end{pmatrix}$$

$$\begin{pmatrix} X & X & X \\ X & Y & Y \end{pmatrix}$$

A typographical or other error may change a rank one matrix into a matrix having a higher rank:

$$\begin{pmatrix} X & X & X \\ X & Y & Y \end{pmatrix} \text{(rank one)} \rightarrow \begin{pmatrix} X & Y & X \\ X & Y & Y \end{pmatrix} \text{(rank two)}$$

where the X entry in the middle top row has erroneously changed to a Y.

Likewise, if a machine vision algorithm fails to detect with high confidence certain individual entries of a matrix (message), it may mark them as "unknown." For example, a matrix S with l=2 missing entries may be:

$$\begin{pmatrix} ? & X & X \\ X & ? & Y \end{pmatrix}$$

Then the missing entries can be replaced with zeros or another integer. The missing entries can be solved for by attempting integer factorization $$S' = uv^T,$$

with $u, v \in \mathbb{Z}_+$, i.e., integer vectors of the appropriate size for the corrected matrix S'. If the projection S' is too different than matrix S, e.g., if $\|S' - S\| > 1$, then the projected matrix S' can be rejected. Otherwise, it can be accepted. Thus, when the rank of S is equal to one and $S \in Z_+$, the nearest rank one matrix is $$S' := \arg\min_S \|S - S_0\| \quad \text{Equation (3)}$$

When $u, v \in \mathbb{Z}_+$ $$u^*, v^* := \arg\min_{u,v} \|S - uv^T\|_p^p \quad \text{Equation (4)}$$

The p-norm can be optimized without being constrained to integers. Elements of the reconstructed matrix can be rounded to the nearest integer. For p=1, $$u^*, v^* := \arg\min_{u,v} |S_{ij} - u_i v_j|, u, v \geq 1$$

An implementation can solve this in any suitable way, such as by using a sequence of linear programs.

In an implementation, a message can contain non-integer characters, each of which can correspond to an integer. For example, the character "&" can correspond to the integer 38, the character "k" can correspond to the integer 107, etc. An encoding of non-integer characters to corresponding integers may be arranged to avoid conflicts with integer characters. For example, the character "9" may correspond to the integer 9 and non-integer characters (such as "$") can be mapped to integers other than 9.

In an implementation, a user may wish to present the message to a receiving device to qualify the user, e.g., to verify the user's identity or to help establish that the user is entitled to a benefit, such as a product or service. For example, if the matrix presented by the user is verified, the user may receive a discount on an item, receive an item for free, activate a service such as an Internet service, a data plan or cellular service, be admitted to a restricted area or venue such as a sporting event, an airplane, a train, a movie theater, a place of business or government building or room, or bypass part or all of a security review or passport control process, and so on. In an implementation, the matrix can be a One Time Password (OTP) that is invalid after it has been used once.

The user may present the matrix to a verifying authority, which can receive the matrix and may locally determine if it is authentic, without having to send the matrix to a remote server for verification. In an implementation, the verifying authority can have a smartphone or other device with a camera that can be used to image the display of the user's cell phone, thereby causing the verifying authority's device to receive the matrix.

In developing economies, sending data to a server for verification can be expensive. An advantage of an implementation is that the verifying device can verify the received matrix locally. The verifying authority's device can determine that the rank of the received matrix is equal to one and accept it as authentic. An action can then occur, based on the successful verification of the matrix.

An alteration to a rank one matrix results in a matrix that is not rank one. The number of changed entries from one rank one matrix to another is equal to at least the number of rows or columns of the matrix, whichever is smaller. In other words, if $\|E_0\|$ is the number of change entries between one rank one N×M matrix and another, then $\|E_0\| \geq \min(N, M)$. In other words, rank one matrices are "far" from each other. A matrix that is not rank one may be analyzed for errors and corrected and/or be rejected.

A received matrix that is not rank one may not have been imaged properly. For example, a machine vision algorithm in the verifying authority device may not have been able to read one or more entries properly and may mark them as "unknown." Or one or more entries may be erroneous, for example due to incorrect entry by the user, incorrect reading by the verifying device, defect in the display of the user device, etc. In such cases, the received matrix may be factored to obtain two vectors. In the case of unknown entries, the unknown entries can be replaced by zero, which has no effect on the norm of the matrix. Alternatively, the unknown entries can be replaced by any integer number or numbers. The factoring can be accomplished in accordance with an implementation of the foregoing disclosure. For example, the two vectors whose product minimizes the distance between the product of the two determined vectors and the received matrix can be obtained, e.g., using linear programming to solve Equation (4), above. The distance can be, for example, the p-norm of the difference between the product of the two vectors and the received matrix. The two vectors may have one or more elements that are real numbers.

A projected matrix of rank one can be determined based on the product of the two vectors. If the projected matrix contains any elements that are not integers, those entries can be rounded to the nearest integer. A distance can be determined between the received matrix and the projected matrix. In an implementation, the distance can be the number of change entries between the received matrix and the projected matrix. If the distance between the received matrix and the projected matrix exceeds a distance threshold, then the received matrix can be rejected. An example of a distance threshold is the smaller of the number of rows and columns of the received matrix. Another example of a distance threshold is the p-norm of the difference between the product of the two vectors and the received matrix. If it does not, then the projected matrix can be the "corrected" version of the received matrix and the matrix is successfully verified.

In an implementation, an action can be taken or not taken based on the successful verification or rejection of the received matrix. For example, actions taken on successful verification can include logging onto a system, logging in to a web site or SaaS service, obtaining a product or service, gaining entry to a restricted area, etc. Actions taken upon rejection of the received matrix can include sending a request for another matrix for the user, requesting additional credentials, locking a service or disabling a product, etc.

As shown in FIG. 1, a user can send a message with a matrix that is received by a verifier. If the verifier determines that the received matrix is rank one, it is accepted as a successful verification. If not, the verifier can reject the matrix or determine if the received matrix is based on a valid matrix, but has errors or omitted entries. To determine if the received matrix is based on a valid matrix, the verifier can factor the received matrix (after adding zero or other numbers to any missing or indeterminate entries) to obtain two vectors. The product of the two vectors is a projected matrix of rank one. The distance can be determined between the received and projected matrices. If the distance is not within (exceeds) a distance threshold, then the received matrix can be rejected. If the distance is within the distance threshold, the received matrix can be successfully verified.

Implementations of the disclosed subject matter can be configured to operate over a network. For example, the receiver (e.g., imager) of the matrix can send it to a server (e.g., a verification server) over a network. The verification server can determine if the matrix is rank one and, if not, determine if it contains errors or omissions and compensate by generating the two vectors and the projected rank one matrix. The server can determine if the distance between the received and projected matrices is within a distance threshold and send an accept/reject message back to the receiver. Likewise, in another implementation, the matrix may be transmitted from a user device directly to a verification server. The matrix can be used as a OTP by the user.

Figure 2:
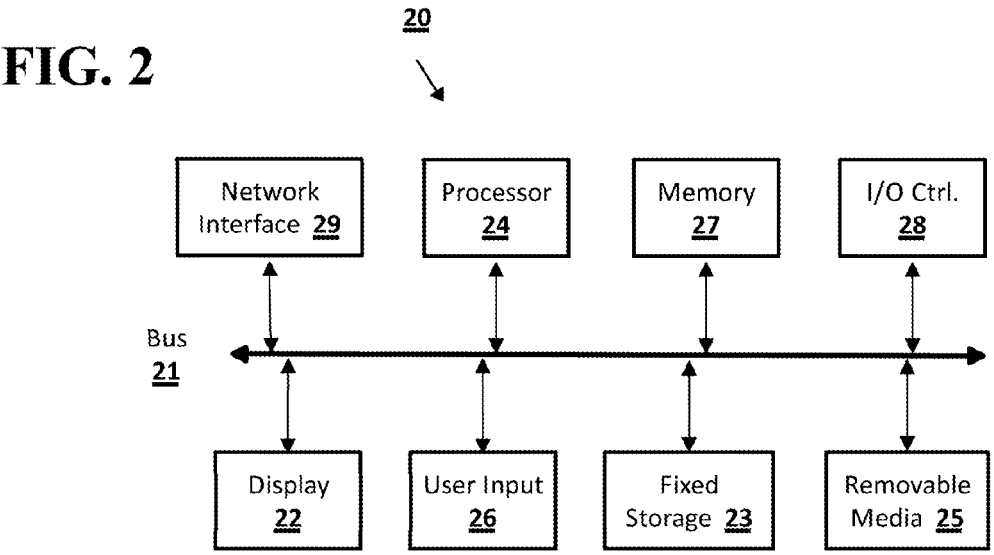
FIG. 2 shows a computer according to an implementation of the disclosed subject matter.

Implementations of the presently disclosed subject matter may be implemented in and used with a variety of component and network architectures. FIG. 2 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) that controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an Internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 3.

Many other devices or components (not shown) may be connected in a similar manner (e.g., document scanners, digital cameras and so on). Conversely, all of the components shown in FIG. 2 need not be present to practice the present disclosure. The components can be interconnected in different ways from that shown. The operation of a computer such as that shown in FIG. 2 is readily known in the art and is not discussed in detail in this application. Code to implement the present disclosure can be stored in computer-readable storage media such as one or more of the memory 27, fixed storage 23, removable media 25, or on a remote storage location.

Figure 3:
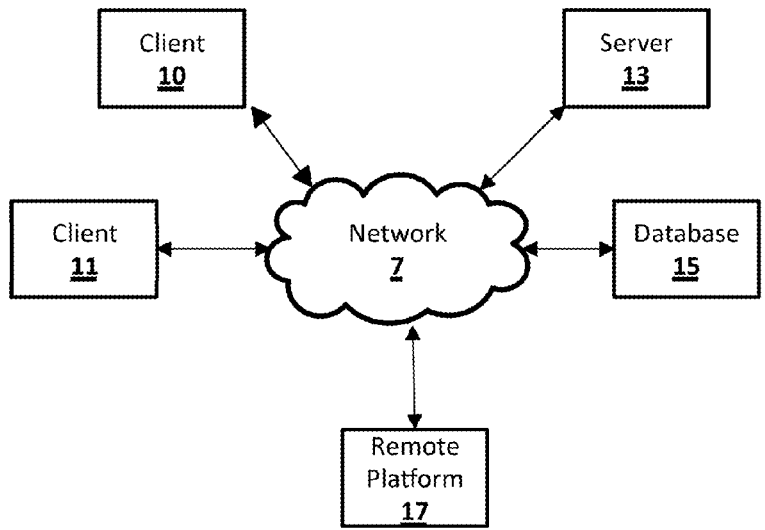
FIG. 3 shows a network configuration according to an implementation of the disclosed subject matter.

FIG. 3 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

An implementation of the disclosed subject matter can include a system that can image and analyze a message having characters presented by a user with a mobile device. The system can include an imager, such as a camera or scanner that can produce an image of the display of the user device that shows the message. The imager can be in connection with a processor. If the characters shown on the user device are not in the form of a matrix, an implementation can internally organize the characters into a suitable matrix. An implementation can derive a received matrix of integers from the plurality of imaged characters. For example, the implementation can assign an integer to each received character via any suitable encoding scheme, such as ASCII, UTF-8, etc. The processor can be configured to determine the rank of the received matrix. If it is equal to one, the received matrix can be accepted. If it is not equal to one, it can be rejected or analyzed to determine if it is based on a valid matrix but has errors or ambiguous or missing entries. The processor can factor the received matrix to obtain two vectors and determine a projected matrix based on the product of the two vectors. The implementation can determine a distance between the received matrix and the projected matrix. If the distance is within a distance threshold, the received matrix can be accepted. If it is outside (exceeds) the distance threshold, it can be rejected. The processor can measure distance as the number of entries (elements) in the projected matrix that are different than the entries (elements) in the received matrix. The distance threshold can be the lesser of the number of rows and the number of columns of the received matrix. If the number of different entries is less than or equal to the distance threshold, then the matrix can be accepted. If the number of different entries is greater than the distance threshold, the matrix can be rejected. In another implementation, the distance threshold can be set to any number.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
taking a picture of a display of a first mobile device by a camera of a second mobile device, the display displaying a plurality of characters arranged in a matrix, at least some of the plurality of characters corresponding to integers, wherein the matrix is a credential;
using, by the second mobile device, machine vision to determine the plurality of characters in the matrix in the picture, wherein the machine vision marks at least one of the plurality of characters as unknown;
replacing each of the at least one of the plurality of characters that is unknown with a replacement integer;
determining, by the second mobile device, that the rank of the matrix in the picture is not equal to one;
factoring, by the second mobile device, the matrix in the picture to obtain two vectors;
determining, by the second mobile device, a projected matrix based on the product of the two vectors;
determining, by the second mobile device, a distance between the matrix in the picture and the projected matrix; and
verifying, by the second mobile device, the credential of the matrix in the picture when the determined distance between the matrix in the picture and the projected matrix does not exceed a distance threshold or rejecting, by the second mobile device, the credential of the matrix in the picture when the determined distance between the matrix in the picture and the projected matrix exceeds the distance threshold.

2. The method of claim 1, further comprising, after verifying the credential of the matrix, permitting at least one action by the first mobile device.

3. The method of claim 1, further comprising, after rejecting the credential of the matrix, locking a service to the first mobile device.

4. The method of claim 1, wherein the matrix in the picture has at least one element that is incorrect.

5. The method of claim 1, wherein the matrix in the picture has M rows and N columns and wherein the determining a distance between the matrix in the picture and the projected matrix comprises determining the number of elements of the projected matrix that are different than corresponding elements of the matrix in the picture.

6. The method of claim 5, wherein the determining that distance between the matrix in the picture and the projected matrix exceeds a distance threshold comprises determining that the number of elements of the projected matrix that are different than corresponding elements of the matrix in the picture is greater than the smaller of M and N.

7. The method of claim 1, wherein the projected matrix includes at least one element that is not an integer and wherein the determining a projected matrix based on the product of the two vectors comprises rounding the at least one non-integer element of the projected matrix to the nearest integer.

8. The method of claim 1, wherein the projected matrix is the closest matrix of rank one to the matrix in the picture.

9. The method of claim 1, wherein the factoring the matrix in the picture to obtain two vectors comprises determining two vectors whose product minimizes the distance between the product of the two determined vectors and the matrix in the picture.

10. The method of claim 9, wherein the distance is the p-norm of the difference between the product of the two vectors and the matrix in the picture.

11. The method of claim 9, wherein determining the two vectors is based on linear programming.

12. A system, comprising:
An imager configured to produce an image of a display of a first mobile device displaying a plurality of characters comprising a credential, at least some of the plurality of characters corresponding to integers;
a processor coupled to the imager, the processor configured to:
receive the image of the display including the plurality of characters;
derive a received matrix from the plurality of characters in the image of the display using machine vision, wherein the machine vision marks at least one of the plurality of characters as unknown;
replace each of the at least one of the plurality of characters that is unknown with a replacement integer;
determine that the rank of the received matrix is not equal to one;
factor the received matrix to obtain two vectors;
determine a projected matrix based on the product of the two vectors;
determine a distance between the received matrix and the projected matrix; and
verify the credential when the determined distance between the received matrix and the projected matrix does not exceed a distance threshold or reject the credential when the determined distance between the received matrix and the projected matrix exceeds the distance threshold.

13. The system of claim 12, wherein the processor is further configured to permit at least one action by the first mobile device when the credential is verified.

14. The system of claim 12, wherein the processor is further configured to lock a service to the first mobile device when the credential is rejected.

15. The system of claim 12, wherein the received matrix has M rows and N columns and wherein the processor is further configured to determine the distance based on the number of elements of the projected matrix that are different than corresponding elements of the received matrix.

16. The system of claim 15, wherein the processor is further configured to compare the number of elements of the projected matrix that are different than corresponding elements of the received matrix to the smaller of M and N.

17. The system of claim 16, wherein the processor is further configured to accept or reject the received matrix based on the comparison of the number of elements of the projected matrix that are different than corresponding elements of the received matrix to the smaller of M and N.

* * * * *